(No Model.)
C. B. ASKEW & J. K. PUMPELLY.
SECONDARY BATTERY.
No. 389,186. Patented Sept. 11, 1888.
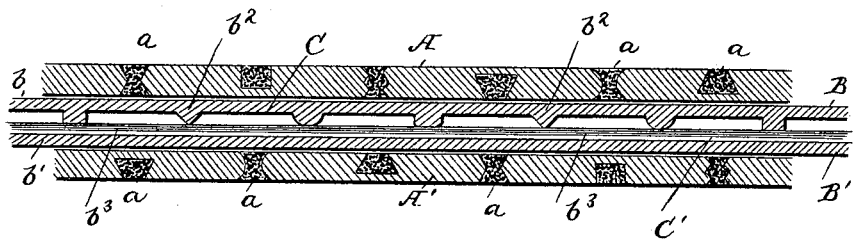
Witnesses:
Inventor,
C. B. Askew.
J. K. Pumpelly,
by Foster Freeman
Attorneys.

UNITED STATES PATENT OFFICE.

CHARLES B. ASKEW AND JAMES K. PUMPELLY, OF CHICAGO, ILLINOIS.

SECONDARY BATTERY.

SPECIFICATION forming part of Letters Patent No. 389,186, dated September 11, 1888.

Application filed July 18, 1888. Serial No. 280,257. (No model.)

*To all whom it may concern:*

Be it known that we, CHARLES B. ASKEW and JAMES K. PUMPELLY, citizens of the United States, residing at Chicago, Cook county, Illinois, have invented certain new and useful Improvements in Secondary Batteries, of which the following is a specification.

Our invention relates to secondary batteries, and has for its object to improve and simplify the construction of such batteries in a manner substantially as hereinafter set forth, whereby the active material is preserved for a longer time and the life of the battery extended.

It is well known that in the use of secondary batteries one of the most difficult problems to overcome is to prevent the active material from becoming detached from the plate, and a great deal of time and ingenuity have been spent in attempts to overcome this objection.

Our invention consists in a simple and effective means for preventing the active material from becoming dislodged and for continuously holding it in place, so that it may be used over and over again and not settle in the bottom of the cell, as it is apt to do in batteries as usually constructed.

The accompanying drawing illustrates so much of a battery as is necessary to disclose our invention.

The active material is usually applied to the plates, which are, in general, made of lead, and which are usually provided with openings of some sort or other appliances—such as ribs or pockets—for receiving and holding the oxide of lead or other active material. Notwithstanding the fact, however, that the active material is thus supported in cavities, the continual charge and discharge, and consequent change of the condition of the material, soon operates to cause its dislodgment. Not only does this so operate, but, especially when the batteries are used while being transported—as, for instance, in driving horse-cars, railway-cars, and the like—the continual jar to which they are subjected operates to dislodge the active material and to cause it to settle at the bottom of the cell. To prevent this dislodgment and overcome these difficulties, we separate the lead plates containing the active material by sheets or plates of some porous material, preferably asbestus, and we form these sheets on one side of a configuration to fit the plate and the active material thereon, and in the instance shown it is flat for this purpose, while the other sides of the sheets or plates are provided with ribs or projections made integral with the sheet, and which furnish a means for the circulation of the solution.

In the drawing, A A' are the metal plates, having openings $a$, in which is placed the active material.

B B' are the sheets or plates of asbestus, one side of each of the sheets, as $b\ b'$, being flat to cover and protect the metal plates, and the other sides, $b^2\ b^3$, of the sheets being provided with ribs, which separate the bodies of the sheet and allow passages C C' for the free circulation of the solution. In the drawing they are shown as simple longitudinal ribs, and when the two sheets B B' are placed together the ribs are arranged at right angles to each other, and thereby form channels C C' throughout the surfaces of the plates, so that there is no impediment to the equal circulation of the solution.

If the battery is made up of a number of metal plates having the active material thereon, these sheets are arranged on both sides in the same way. This arrangement permits us to use the plates in a horizontal position, which is often a considerable advantage, as it will be seen that whatever the position of the plates, whether upright or flat, the active material is securely held in position.

What we claim is—

1. The combination, with a plate of a secondary battery carrying the active material, of a supporting-plate of porous material, one side of which conforms to the shape of the metal plate, and the other side of which is provided with separating-ribs, substantially as described.

2. The combination, with the plates of a secondary battery, of the supporting-plates, one side of each of which plates conforms to the shape of the metal plate, and the adjacent sides of the supporting-plates being provided with longitudinal ribs integral with the body of the plates, whereby the active material may be securely held in position and free circulation of fluid allowed, whether the plates be upright or horizontal, substantially as described.

In testimony whereof we have signed our names to this specification in the presence of two subscribing witnesses.

CHARLES B. ASKEW.
    JAMES K. PUMPELLY.

Witnesses:
 F. H. SNIDE,
 J. McK. PENDLETON.